United States Patent [19]

Kirchmeyer

[11] 3,777,922

[45] Dec. 11, 1973

[54] LOADER FOR ELEVATING A LOAD ONTO AN AUTOMOTIVE VEHICLE TOP

[75] Inventor: Paul A. Kirchmeyer, Redmond, Wash.

[73] Assignee: Reinell Boats, Inc., Marysville, Wash.

[22] Filed: Feb. 10, 1971

[21] Appl. No.: 114,203

[52] U.S. Cl............................. 214/450, 214/83.24
[51] Int. Cl............................................. B60r 9/00
[58] Field of Search......................... 214/450, 83.24

[56] References Cited
UNITED STATES PATENTS

| 3,128,893 | 4/1964 | Jones | 214/450 |
| 3,495,729 | 2/1970 | Kruse | 214/450 |
| 1,316,195 | 9/1919 | Scheunemann | 214/83.24 |
| 3,112,041 | 11/1963 | Havens | 214/450 |

Primary Examiner—Gerald M. Forlenza
Assistant Examiner—John Mannix
Attorney—Robert W. Beach

[57] ABSTRACT

A load-supporting frame is elevated to the top of an automotive vehicle, such as a camper, and shifted forward to a stowed position. In loading a boat a frame attached to the boat in horizontal attitude is first tilted into upright position alongside upright supporting links, followed by conjoint tilting of the frame and such links into horizontal position at the top of the vehicle for conjoint shifting forward into stowed position. Other types of boat are hoisted along upright members which are tilted into horizontal position when the load is raised, and shifted forward with the load into stowed position. Elevation of the boat or other load and shifting of the load forward along the top of the vehicle into stowed position is accomplished by a power drum pulling a single line which is connected to the load support.

12 Claims, 21 Drawing Figures

INVENTOR.
PAUL A KIRCHMEYER
BY Robert W. Beach
ATTORNEY

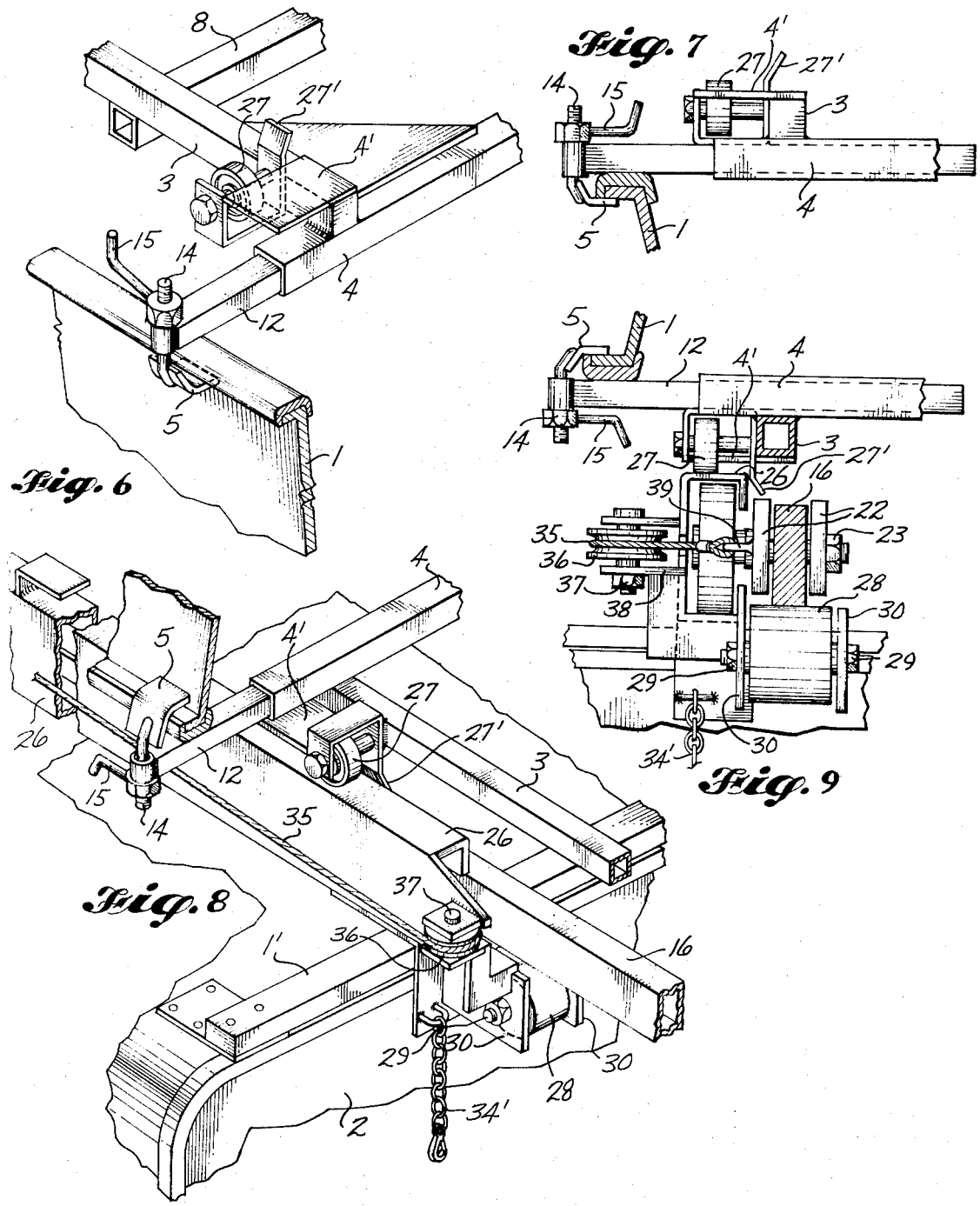

INVENTOR.
PAUL A. KIRCHMEYER
BY
Robert W. Beach
ATTORNEY

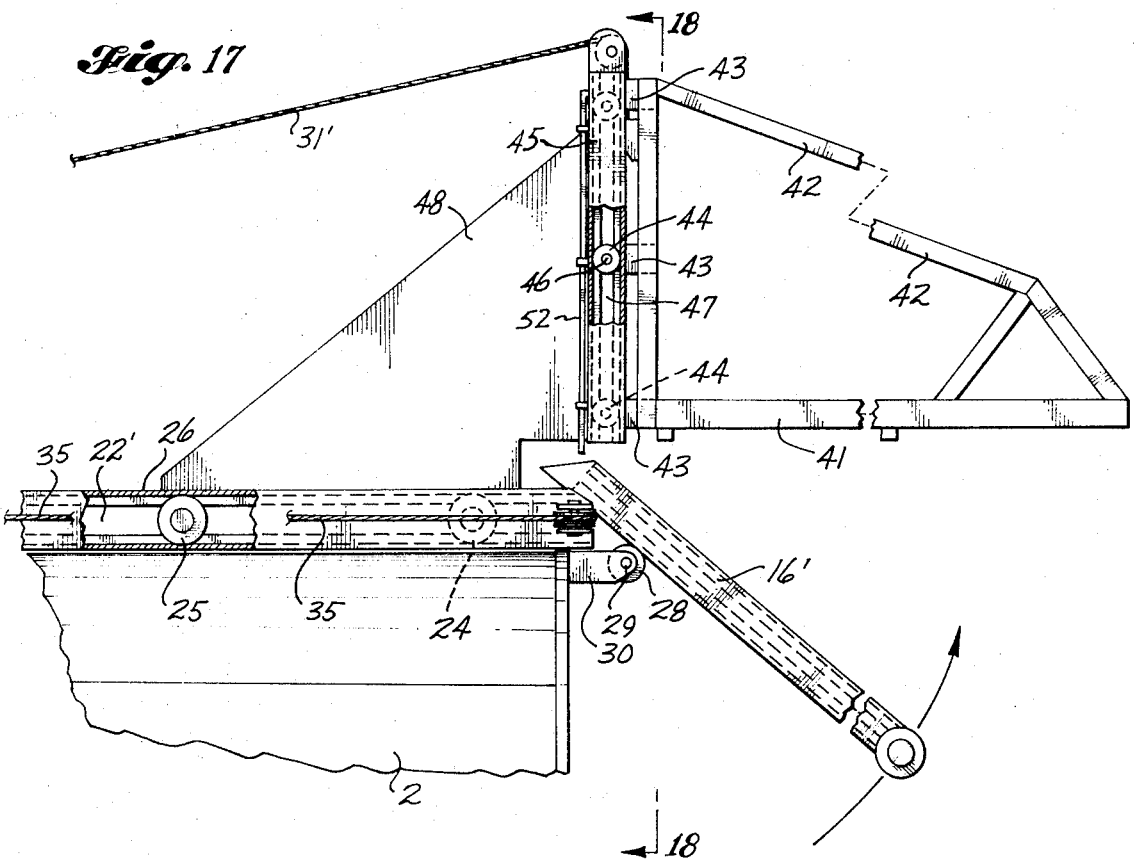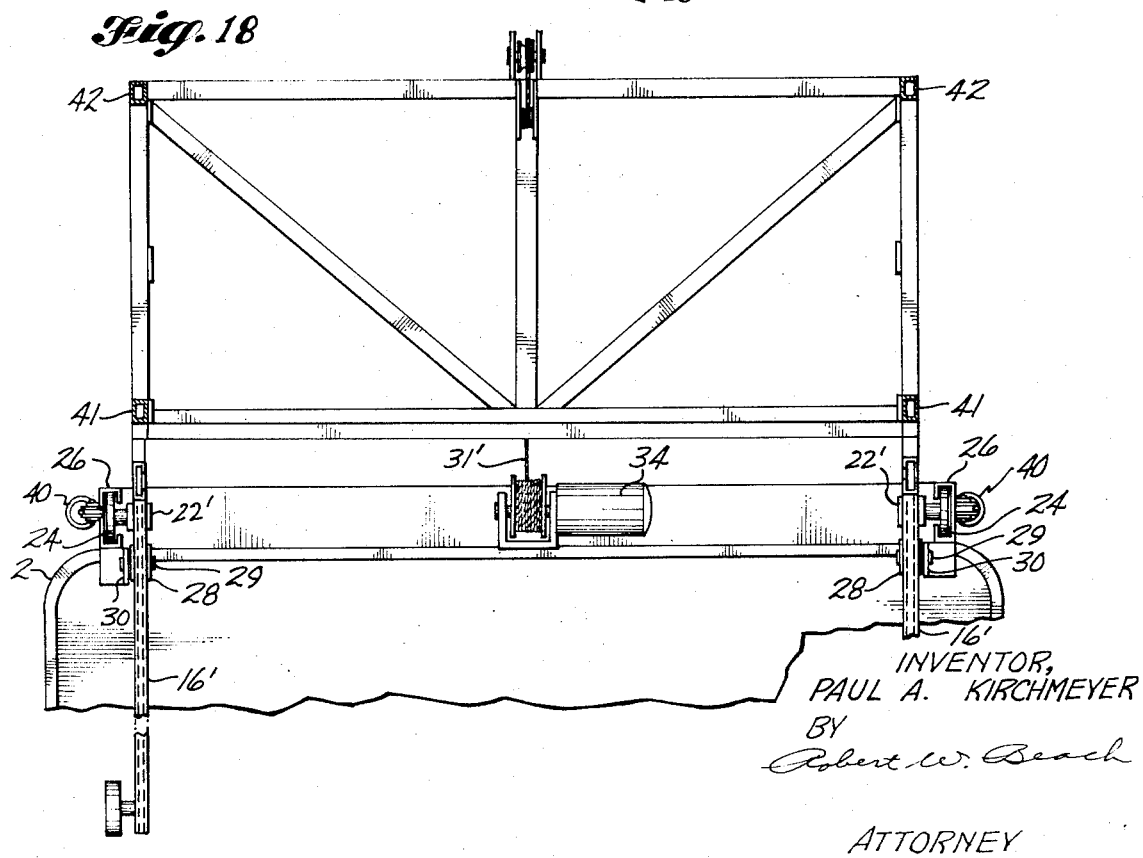

INVENTOR,
PAUL A. KIRCHMEYER
BY
Robert W. Beach
ATTORNEY

LOADER FOR ELEVATING A LOAD ONTO AN AUTOMOTIVE VEHICLE TOP

A principal object of the present invention is to provide a loader for first elevating a load to the top of an automotive vehicle, and then shifting the load forward along the vehicle top into stowed position automatically, and preferably by the application of power. An associated object is to enable the movement of the load toward its stowed position to be arrested in any position and to be held in such position.

A further object is to provide such a loader which will secure the load automatically when it reaches stowed condition.

Another object is to provide a loader for a boat which can be attached to and released from the boat quickly when the boat is in its usual position, which can be adjusted readily to fit boats of different size, and which will hold securely the boat to which it is attached.

An additional object is to provide a loader which can be adapted readily to elevate and stow on the top of an automotive vehicle loads of different character, which loader can be applied to automotive vehicles of different types and sizes.

It is also an object to provide a loader having such capabilities which is strong and rugged, yet which is of simple construction and is light and compact.

A further object is to provide such a loader which can be constructed economically and which will not require any substantial amount of maintenance.

FIG. 6 is a detailed top perspective of a portion of the boat-supporting mechanism, and FIG. 7 is a side elevation of such mechanism.

Figure 10:
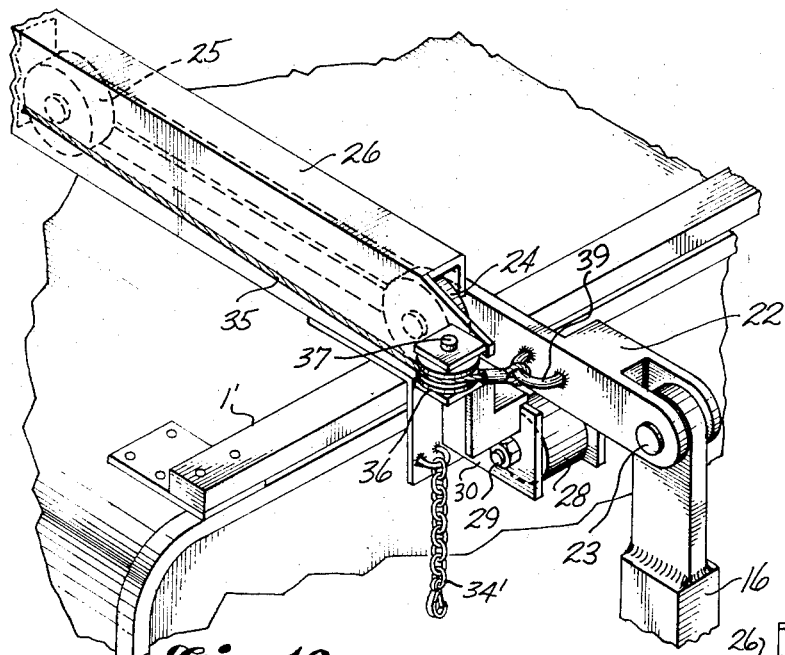
Figure 11:
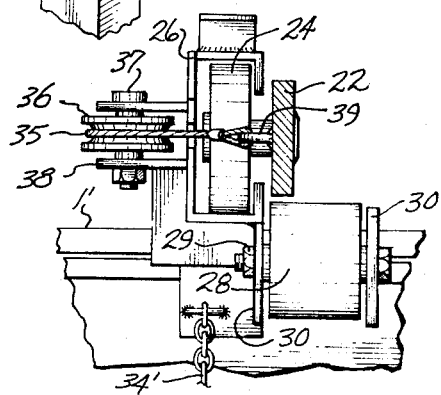

FIG. 8 is a detail top perspective of a portion of the loader at the top of the camper; FIG. 9 is an elevation of the same mechanism with parts in a different position; and FIG. 10 is a top perspective of the same portion of the mechanism with parts in still a different relationship. FIG. 11 is a rear elevation of the same portion of the mechanism, with parts broken away.

Figure 12:
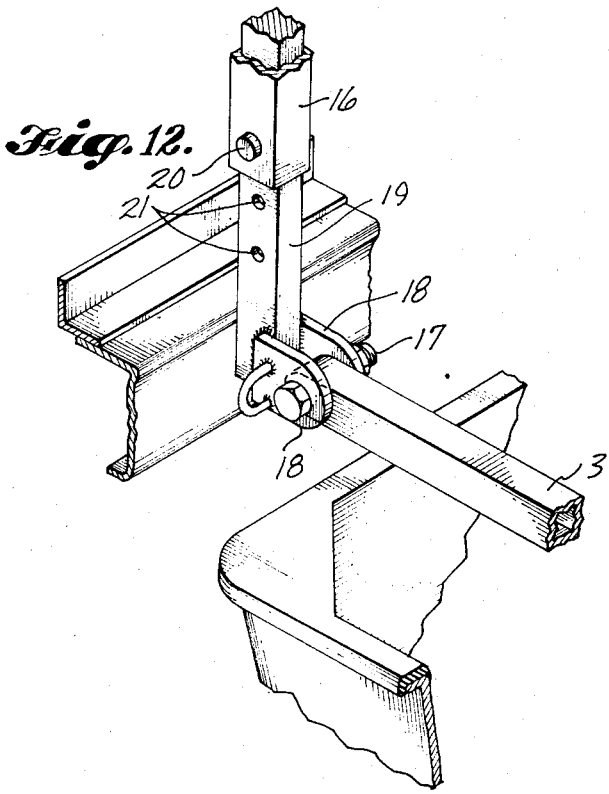

FIG. 12 is a detail top perspective of a different portion of the loader.

FIGS. 13, 14, 15 and 16 are side elevations of a camper equipped with a modified type of loader to elevate and stow a load different from a boat, the several figures showing parts in different operative positions.

FIG. 17 is a fragmentary detail side elevation of the loader construction of FIGS. 13 to 16, with parts broken away, and FIG. 18 is a rear elevation of such loader, with parts broken away.

Figure 19:
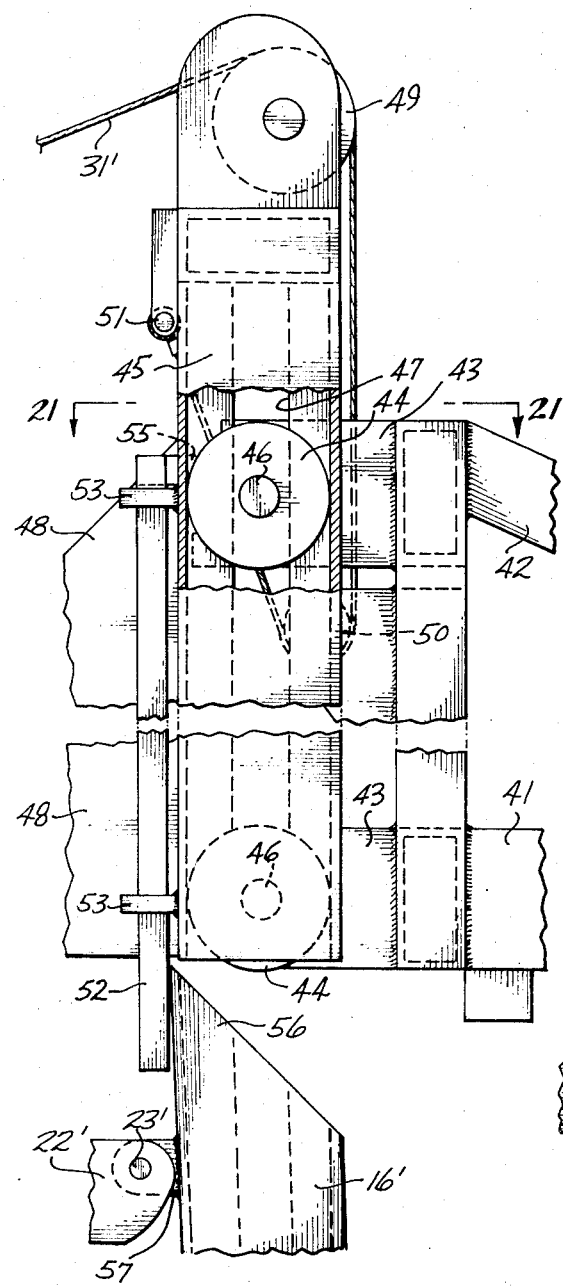
Figure 20:
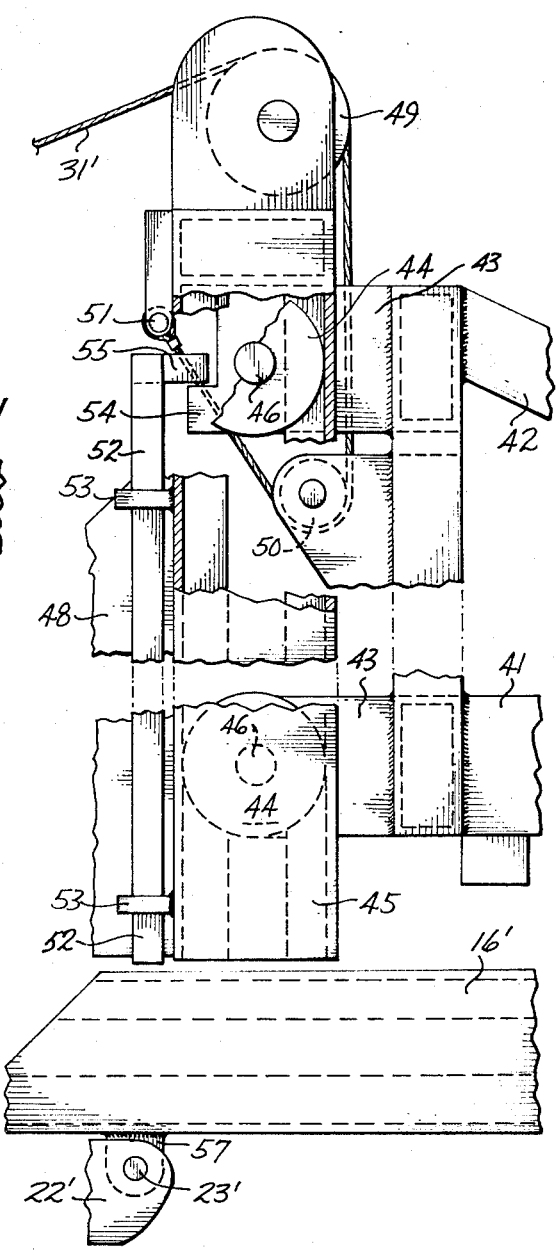
Figure 21:
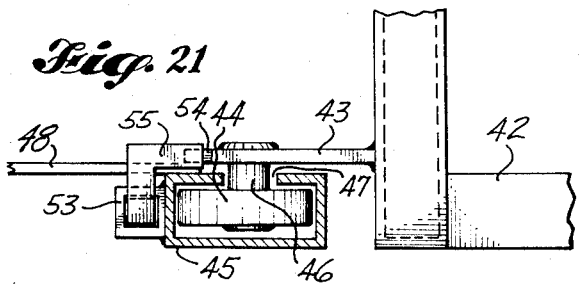

FIG. 19 is a fragmentary detail side elevation of a portion of the loader shown in FIGS. 13 to 18, having parts broken away, and having parts in an operative position different from those shown in FIGS. 13 to 18; and FIG. 20 is a similar view with parts in still a different relationship. FIG. 21 is a horizontal section taken on line 21—21 of FIG. 19.

While the loader of the present invention can be used for loading onto the top of an automotive vehicle articles of various types, it is particularly useful for loading onto the top of a camper a rowboat or outboard motorboat, 8 to 18 feet in length, and preferably 14 feet in length.

FIGS. 1 to 5, inclusive, illustrate the manner in which such a boat can be loaded and unloaded. For the loading operation the boat 1 is placed right side up on the ground behind the camper 2. The length of the boat extends lengthwise of the camper, and the stern of the boat is located adjacent to the rear of the camper.

The loader includes a boat-supporting frame having two parallel longitudinal bars 3, spaced closer together than the width of the boat and extending lengthwise of the boat. The end portions of these longitudinal bars remote from the camper are connected by a bow cross member 4, the opposite ends of which carry clamps 5 engageable with opposite gunwales of the boat. The portions of the longitudinal bars 3 overlying the stern portion of the boat are connected by a cross member 6, the opposite ends of which carry clamps 7 for engagement with the opposite gunwales of the boat.

Between the bow cross member 4 and the stern cross member 6, the frame may include forward and rearward intermediate transverse frame members 8 and 9 connecting the longitudinal bars 3. Such additional transverse frame members are particularly desirable if an outboard motor 10 is to be stowed within the boat. Such motor can be supported by a bracket 11 on one of the longitudinal members 3.

In order to accommodate boats of different widths each of the bow and stern cross members 4 and 6 can be constructed so that their effective length can be altered. For this purpose each of these members can be a hollow bar of square cross section of a length less than the minimum width of boat to be loaded. Square bar extensions 12 carrying the gunwale clamps 5 have their inner ends inserted slidably into the hollow bar forming the central portion of the bow cross member 4. Correspondingly, extension bars 13 carrying the gunwale clamps 7 have their inner ends inserted slidably into the hollow bar forming the central portion of the stern cross member 6.

Each of the gunwale clamps, shown best in FIGS. 6 to 9, includes a bolt 14 extending through a socket carried by the outer end of the cross member extension. The end of such bolt opposite its nut carries a hook engageable beneath the gunwale of the boat. To facilitate rotation of the bolt's nut a crank 15 projects from the nut. Such crank both facilitates tightening and loosening of the nut and also enables the nut to be tightened securely so that the hook will draw the gunwale of the boat firmly against the cross member extension, as shown particularly in FIGS. 7 and 9.

The ends of the longitudinal frame members 3 adjacent to the camper are connected to elongated members 16, which are swingable between positions depending downward adjacent to the rear of the camper and horizontal positions on top of the camper. The members 16 shown in FIGS. 1 and 12 constitute links having their lower end portions connected respectively by pivots 17 to the adjacent ends of the longitudinal frame members 3. Such pivots extend through the frame members and are carried by ears 18 secured to and projecting transversely of the lower ends of the links 16 in parallel relationship.

The lengths of the links 16 can be adjusted to support the boat-supporting frame at various heights, depending upon the height of the camper and the boat to be handled. Such adjustment in the length of the link 16 can be effected by having the central portion of each link made of square section bar stock, into which extension bars 19 can be slidably fitted. Each extension bar is connected to its link by a pin 20 extending through holes in the link and through any selected one of several holes 21 in the extension 19.

The upper ends of the load-supporting links 16 are connected respectively to slide bars 22 on top of the camper, having their lengths extending lengthwise of the camper. Such connection is effected by pivots 23 shown best in FIG. 10. Each slide bar is supported for movement lengthwise of the camper by rollers 24 and 25 received in a channel-shaped track 26, secured to the camper top. Such track extends lengthwise of the camper for a distance at least as great as the distance the boat or other load is to be shifted forwardly along the camper top after such load has been elevated to the level of the camper top.

Figure 4:
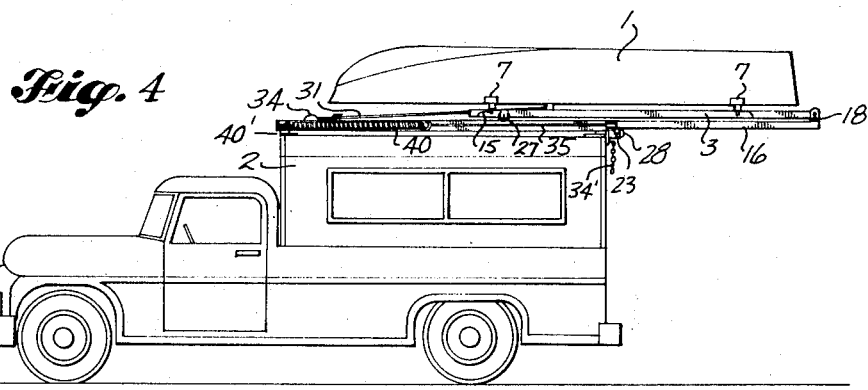
FIG. 4 is a side elevation showing the boat tilted into inverted position partially overlying the top of the camper.
Figure 5:
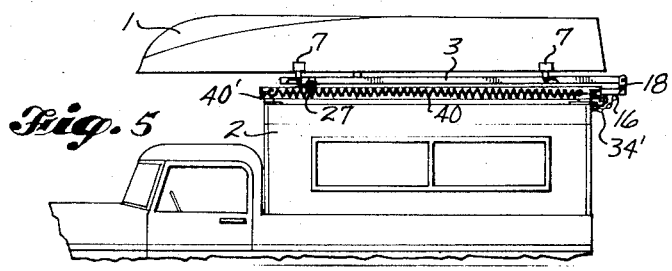
FIG. 5 is a side elevation of the camper and boat with the boat shifted forward along the camper top into stowed position.

Rollers 24 and 25 support the slide bars 22 for shifting the boat from the position shown in FIG. 4 to the position of FIG. 5. In addition, rollers 27, mounted directly on the boat-supporting frame, as shown in FIGS. 6 and 7, are positioned to roll on the upper side of the track 26, as shown in FIGS. 8 and 9. A further roller 28, mounted at the rear of the camper on an axle 29 carried by mounting ears 30, is in a position for engagement by each of the bars 16 when the bar is in its raised, horizontal position shown in FIGS. 4 and 8.

Figure 1:
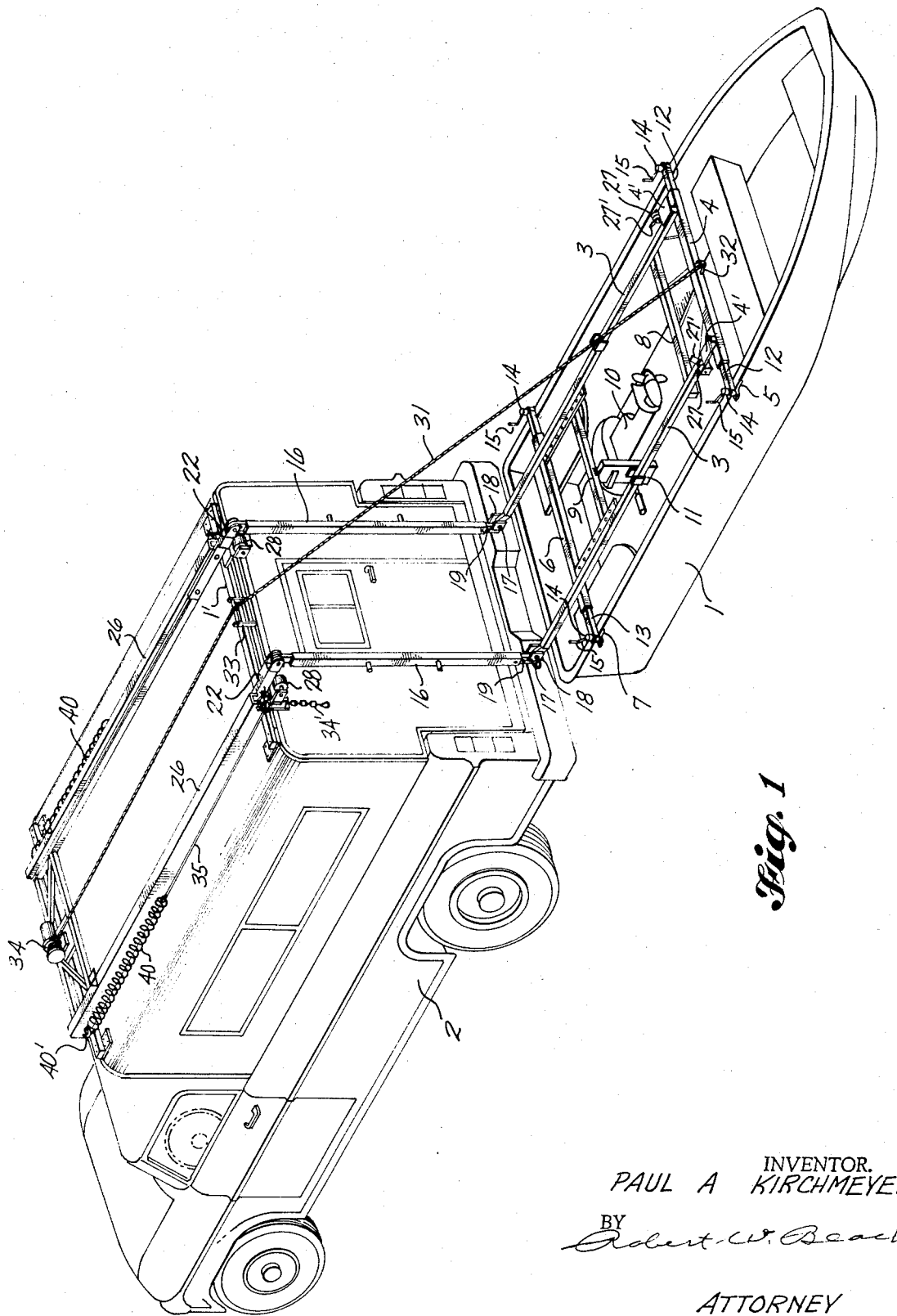
FIG. 1 is a top perspective of a camper equipped with a loader of the present invention, shown in a condition ready to hoist a boat.
Figure 2:
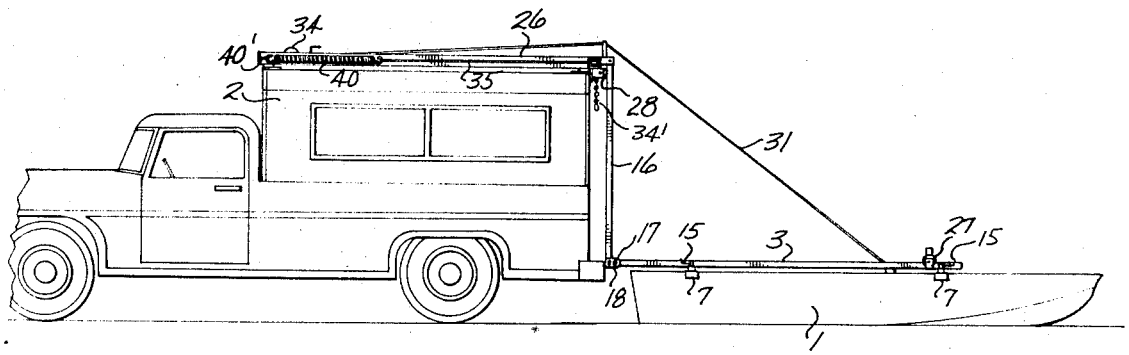
FIG. 2 is a side elevation of the camper with the boat in the same position.
Figure 3:
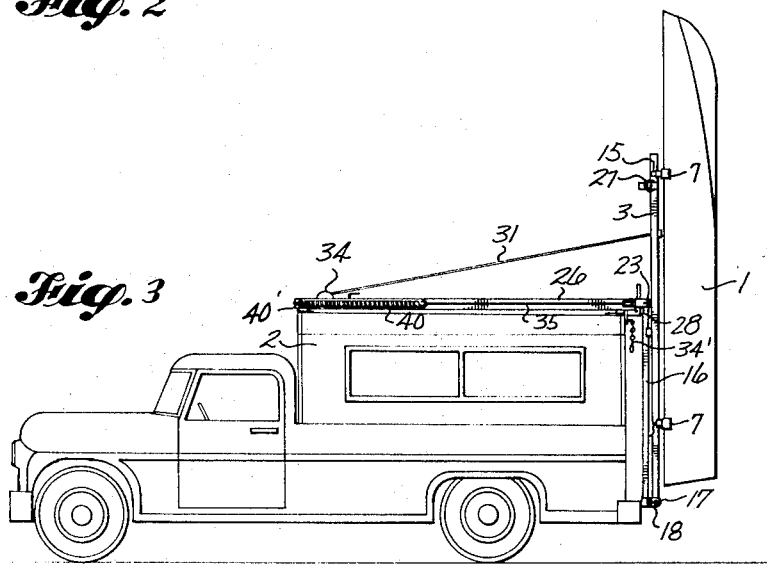
FIG. 3 is a side elevation of the camper showing the boat raised and tilted into an upright position.

The entire boat-elevating operation and horizontal shifting of the elevated boat into stowed position is effected by the hoisting or hauling line 31 shown in FIGS. 1, 2 and 3. The end of this line is anchored in the line-attaching eye 32, mounted on the bow frame cross member 4. From such eye the line extends forwardly over the line guide 33 at the rear of the camper top to the hoisting line winch 34, which preferably is motor-driven, although it could be of the hand-crank type.

FIGS. 1 and 2 show the boat 1 on the ground behind the camper 2 with the clamps 5 and 7 of the attaching frame secured to the gunwales of the boat. When the operator has thus secured the boat to the frame by rotating handles 15 on the nuts of bolts 14 to draw the clamps tight, the operator may simply effect or control rotation of the winch 34 to wind in the hauling line 31.

Pulling force exerted by the line 31 being wound on winch 34 applied to the boat-supporting frame at the eye 32 will swing such frame and boat upward about pivots 17 connecting the frame to the load-supporting links 16 until the frame has been folded alongside the links in their upright positions and the length of boat 1 is vertical, as shown in FIG. 3. During the initial stage of this swinging of the boat-supporting frame and boat, the line 31 will ride on the line guide 33; but as the boat nears its vertical position, the line will be raised above the line guide because the distance between the pivots 17 connecting the boat-supporting frame to the links 16 and the eye 32 is greater than the length of such links.

At least by the time the frame and boat 1 have reached the upright position of FIG. 3, the pull on line 31 will have moved the upper ends of links 16 and slides 22 forward sufficiently so that the upper end of the link will have been moved from the position shown in FIG. 10 forwardly into engagement with the roller 28. Application of additional pulling force to the line-attaching eye 32 of the boat-supporting frame after such frame has been folded along-side the links 16, will cause the links, frame and boat to swing conjointly about the pivots 23, connecting the upper ends of the links 16 to the slides 22, from the position shown in FIG. 3 to that of FIG. 4.

DUring such swinging of the boat 1 and the supporting frame from the position of FIG. 3 to the position of FIG. 4, the upper portions of the links 16 will bear against the rollers 28. In order to ease the load on the hauling line 31, it is preferred that the center of gravity of the boat 1 and the supporting frame, when the boat and frame are in the position of FIG. 3, not be much lower than the pivots 23. The center of gravity of the boat and frame should, however, not be higher than such pivots to avoid the boat flopping from the position of FIG. 3 to that of FIG. 4.

At or immediately prior to the time the boat 1 and its supporting frame reach the horizontal position of FIG. 4, sych boat frame, load-supporting links 16 and slides 22 will begin to be pulled forwardly along the top of the camper with the upper portions of the links 16 riding on rollers 28. As soon as the center of gravity of the boat and frame have moved forwardly beyond the rollers 28, the force of gravity will press the frame-carried rollers 27 adjacent to bow cross member 4 into engagement with the upper sides of tracks 26, as shown in FIGS. 8 and 9.

Continued pulling of winch 34 on line 31 will then shift the slides 22, links 16, boat-supporting frame and boat forward from the position of FIG. 4 to that of FIG. 5 into stowed position. It is not necessary to perform any special operation to anchor the boat in such stowed position, because the boat cannot move forward, rearward or upward. The tracks 26 and winch 34 are anchored securely by being mounted on bars 1' which are bolted to the camper top at the front and rear of the camper. One of the slides 22, having reached a limit switch mounted on the forward portion of a track 26 if the line 31 is wound by an electric motor, or other suitable stop, will terminate forward movement of the slides, the links 16 connected to the slides, the boat-supporting frame connected to the links, and the boat secured to the boat-supporting frame.

The line 31 connecting the winch 34 and the eye 32 of the boat-supporting frame will prevent such frame, and consequently the boat 1 attached to it, from moving rearward if the winch 34 is braked, locked or blocked to prevent its drum from turning in the direction for unreeling of line 31. A safety chain 34' may also connect an eye on the camper and an eye on the lug 18 to hold the frame and load against rearward movement. The eye 32 is close enough to the winch 34 so that such eye cannot move upward appreciably, and consequently the bow portion of the frame and boat will be held down securely. Plates 4' on the bow cross member may also slide under lugs on tracks 26 to prevent the forward end of the frame and boat from lifting if the line 31 should break or the winch not hold. The rear portion of the boat and frame will be held down because, in order for them to rise, it would be necessary for the rear portion of the frame and boat to swing upward about the eye 32 and for the links 16 to swing upward about pivots 23. Since such eye and pivots are not in the same line transversely of the camper, such swinging is prevented.

Also, the boat is anchored against sidewise swinging or sliding. Appreciable lateral shifting of the bow portion of the boat is prevented by the short coupling of eye 32 to winch 34 by line 31. Also lugs 27' project downward from the frame along the inner sides of tracks 26. The rear portion of the boat-supporting frame is held against sidewise shifting relative to the links 16 by the connecting pivots 17. The links 16 cannot swing or shift sidewise because, as shown best in FIGS. 8 and 9, such links fit between the tracks 26 and are located respectively alongside such tracks.

While the boat is moved from the position of FIGS. 1 and 2 into the stowed position of FIG. 5 entirely by pulling on line 31, the boat cannot be moved toward its initial position of FIGS. 1 and 2 by such line. To move the boat from the position of FIG. 5 to that of FIGS. 1 and 2, unloading mechanism and gravity are relied upon. Such unloading mechanism includes a haulback line 35, shown in FIGS. 2 to 4 and 8 to 11, extending around a haulback pulley 36 rotatable on an axle 37 carried by mount 38 on the rear end of track 26. One end of such line is attached to an anchoring eye 39 on slide 22. The other end of such line is attached to one end of a haulback tension spring 40 located alongside a track 26 and having its forward end secured to an anchor 40' adjacent to the front end of track 26.

A haulback spring 40 and line 35 are provided alongside each track 26 and attached respectively to the two sliders 22. As each slider is thrust forwardly by pressure applied to it by the link 16 connected to it, such slider will pull a portion of its haulback line 35 forwardly around pulley 36 to move rearwardly the end of such line attached to spring 40. By such action spring 40 is stretched from the condition shown in FIG. 4 to that of FIG. 5.

When it is desired to unload the boat from the stowed position of FIG. 5, the winch 34 is unlocked or unblocked, or its brake is released, so that the supporting frame and the boat secured to it are free to move rearwardly toward the position of FIG. 4. The tension of springs 40 transmitted through the haulback lines 35 to the sliders 22 will move such sliders, links 16 connected to them, and the frame connected to such links, rearwardly to the limiting position of the haulback mechanism shown in FIGS. 4 and 10.

As has been mentioned previously, when the boat 1 and its supporting frame are in the position shown in FIG. 4, the center of gravity of such boat and frame combination should be rearward of the axis of pivots 23. Consequently, the stern portion of the boat, the rear portion of the boat-supporting frame and the links 16 will be swung downward by gravity about the pivots 23 to the extent that line 31 is paid out by the winch 34. When the boat frame and links have reached the upright position of FIG. 3, further paying out of line 31 will enable the force of gravity to swing the boat and frame downward about pivots 17 connecting the frame and links 16 until the boat has been lowered fully to the position shown in FIGS. 1 and 2.

It will be evident that throughout such unloading operation control over the speed of movement of the boat can be maintained simply by controlling the unreeling speed of winch 34 by suitable brake means. As in the loading operation the winch can be fully braked, locked or blocked with the boat in any attitude, and the boat can be maintained in such attitude until the winch drum is again freed to turn in the line-unreeling direction.

While the structure of the loader described in connection with FIGS. 1 to 12 is particularly suitable for loading a boat on a camper, similar loader mechanism can be used for loading other types of loads. Such an alternative form of loader is shown in FIGS. 13 to 21 inclusive. In this instance the load-supporting frame is elevated vertically instead of being swung upward in the type of loader described above; and when it has been elevated to the level of the camper top, such frame is then shifted forward into stowed position. In this instance the load-supporting frame includes the base platform 41 having opposite side rails 42.

Short bars 43 projecting forward from the loadsupporting frame carries rollers 44 received in a roller guide track 45 of substantially rectangular cross section providing slight clearance for the rollers. Axles 46 supporting such rollers pass through a slot 47 extending lengthwise of the track. Such track, shown best in FIGS. 17, 19, 20 and 21, is supported above the top of the camper 2, as shown in FIG. 13, by a plate 48, but each of the load-supporting members 16' constitutes a similar track.

Figure 13:
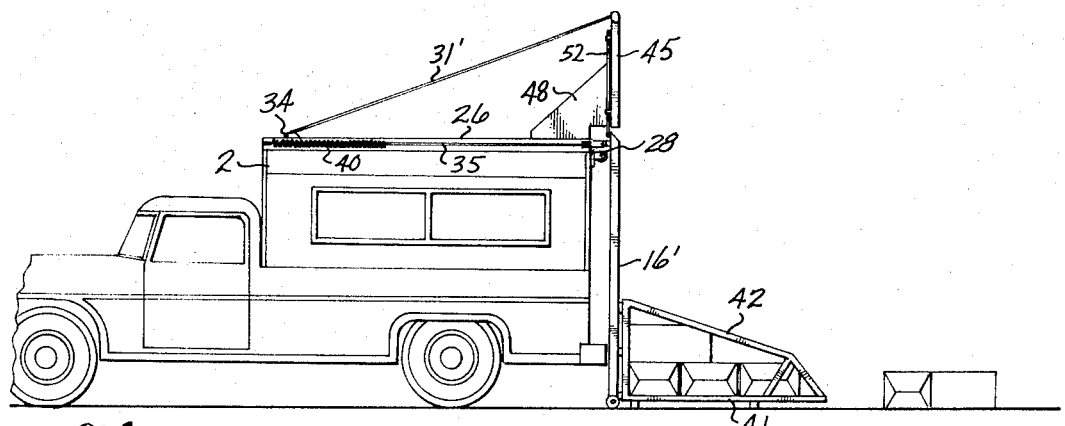
Figure 14:
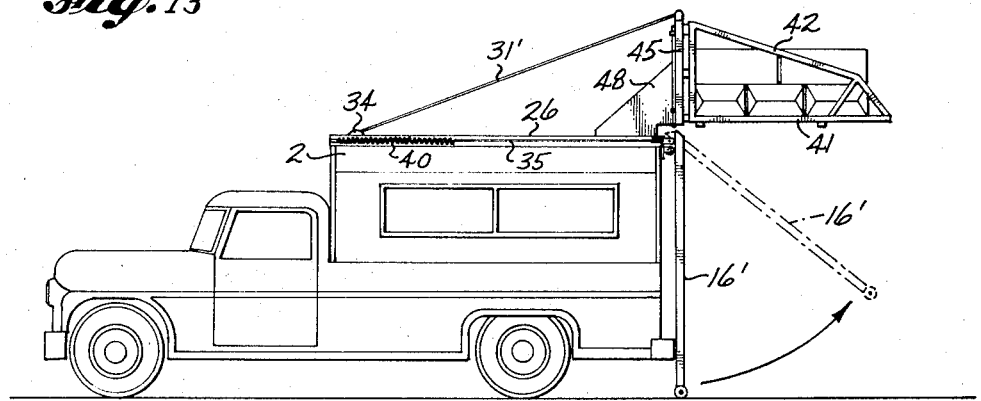
Figure 15:
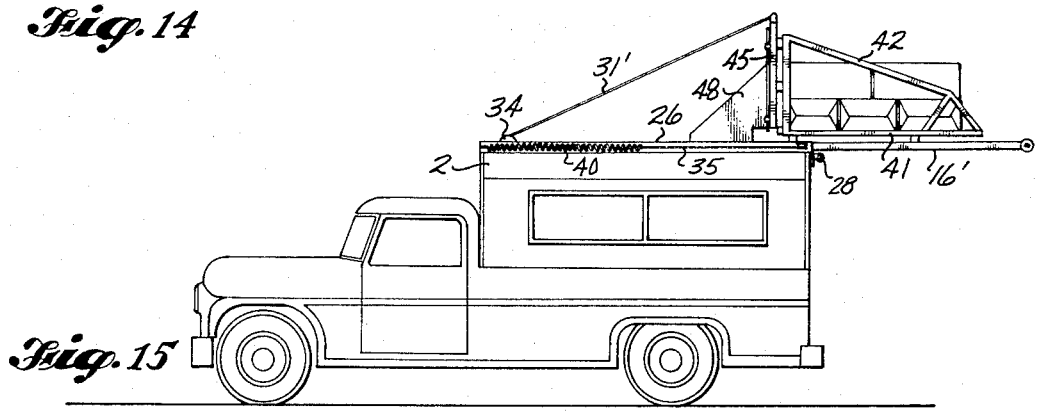
Figure 16:
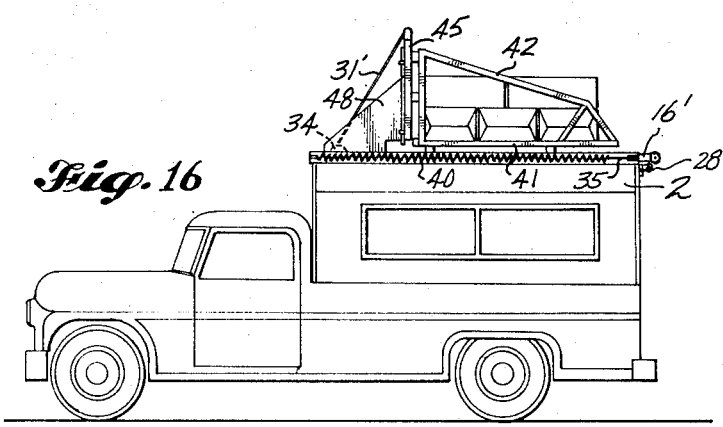

In the case of this loader the load-supporting frame is elevated from the position of FIG. 13 to that of FIG. 14 and shifted forward from the elevated position of FIG. 14 to the stowed position of FIG. 16 by a hauling line 31' pulled by the winch 34, shown in FIGS. 13 to 16 and 18. As shown in FIGS. 19 and 20, from the winch this hauling line extends around a guide pulley 49 mounted on the upper end of the track 45, downward around a pulley 50 carried by the load-supporting frame, and upward to an anchor 51 on the track 45.

The platform 41 of the load-supporting frame is loaded when it is resting on the ground, as shown in FIG. 13. Such a platform may carry several load components, as indicated in FIG. 13, or a single load component such as a snowmobile, if desired. When loaded, the load-supporting platform and its load can be elevated by reeling in the hoisting line 31'. Such hoisting line has a double purchase because the end of the line is anchored at 51 to the stationary track 45 and the supporting frame pulley 50 engages a bight of the line.

During hoisting of the load-supporting frame along the guide members 16' such guide members are maintained in vertical position and the tracks 45 are held in lengthwise registry with such guide members by latch means including a bar 52 held alongside the track 45 by guide straps 53 encircling the latch bar at spaced locations and mounted on such track. As shown in FIGS. 20 and 21, such latch bar can be reciprocated lengthwise relative to the track by engagement of a lug 54 on the load-supporting frame with a hook 55 on the upper end of the latch bar.

When the latch bar is in its lower position shown in FIGS. 13 and 19, its lower end extends downward into overlapping relationship with the tip 56 of the corresponding frame member 16', which projects upward above a lug 57 through which the mounting pivot 23' for the guide member extends. Such engagement of the guide member tip with the lower end of the latch bar will prevent the guide member being swung from the upright, solid-line position shown in FIG. 14, toward the broken-line position of that figure.

As shown in FIGS. 17 and 18, each plate 48 supporting a track 45 is mounted on a slide 22' having rollers 24 and 25 running in track 26 for movement horizontally along the top of the camper. The two slides 22', track-supporting plates 48 and tracks 45 therefore form a carriage for supporting the load-supporting frame and carrying it over the top of the camper from the position shown in FIG. 14 through that of FIG. 15, to the position of FIG. 16. It is necessary, therefore, that the lengths of tracks 45 be at least as great as the height of the load-supporting frame.

During elevation of the load and load-supporting frame from the ground-supported position shown in FIG. 13 to the elevated position of FIG. 14, the guide members 16' will be held in upright position by the lower ends of the latch bars 52 serving as stops engageable by the tips 56 of such guide members, as shown in FIG. 19 and described above. As the upper roller 44 carried by the load-supporting frame is raised beyond the upper end of a guide member 16', it will move into the lower end of the track 45 in registry with such guide member.

When the load-supporting frame has been raised far enough so that the lowest roller 44 leaves the upper end of guide member 16' and enters the lower end of the track 45, the lug 54 will come into engagement with the hook 55 on the upper end of the latch bar. Continued raising of the load-supporting frame will then cause such lug to raise the latch bar from the position of FIG. 19 to that of FIG. 20. As long as the tip 56 of the guide member 16' is in engagement with the lower end of the latch bar 52, the pull on line 31' cannot move the carriage forward along the top of the camper, because the body of the guide member bears against roller 28, as shown in FIGS. 13 and 17, serving as a stop.

As soon as upward movement of the load-supporting platform is sufficient so that the latch bar 52 is raised by lug 54 from the position shown in FIG. 19 toward the position of FIG. 20 to clear the tip 56 of the guide member 16, the pull on line 31' will begin to move the carriage, including tracks 45 carrying the load-supporting frame, forward along the top of the camper from the position of FIG. 14 to that of FIG. 15.

Because the upper portion of each guide member 16' is connected to the corresponding slide 22' by the pivots 23', the upper end of the guide member will be moved forward correspondingly. Because a portion of such guide member below pivot 23' bears against the roller 28, such guide member will be swung from the solid-line position shown in FIG. 14 upward to the broken-line position of that figure and the solid-line position of FIG. 17. Continued forward movement of the carriage and slides 22' will cause the guide members to be swung progressively farther upward into the substantially horizontal position of FIG. 15.

Preferably the length of travel of the carriage and slides 22 along the camper top will be approximately equal to the length of each guide member 16', so that when the load has been moved forward into the stowed position shown in FIG. 16, the guide members will have been moved substantially fully forward to overlie the camper top. When the carriage and load-supporting frame have reached such stowed position, it is desirable to relieve the pull on the line 31' slightly so that the load-supporting platform rollers 44 will move downward in the track 45 sufficiently to enable opposite longitudinal edge portions of the platform 41 to rest on the guide members 16'. The winch 34 can then be braked, locked or blocked in that position.

In the loader shown in FIGS. 13 to 18 unloading mechanism similar to that described in connection with the loader shown in FIGS. 1 to 12 is provided. Such unloading mechanism includes the haulback lines 35 alongside the tracks 46, each having one end connected to a slide 22' and its other end connected to a haulback spring 40.

Such unloading mechanism operates to shift the load-supporting frame rearwardly from the position of FIG. 16 through the position of FIG. 15 to the position of FIG. 14, in the manner described in connection with the boat loader. Gravity will swing the guide members 16' downward from the positions of FIG. 15 to the position of FIG. 14 into lengthwise registry with the tracks 45. As the line 31' is paid out farther, the load-supporting frame will descend, so that rollers 44 will move from the tracks 45 downward into the guide members 16', and the latch bar 52 will drop into the guide member latching position shown in FIG. 19. As the line continues to be paid out, the load-supporting frame will finally be lowered into the position shown in FIG. 13, resting on the ground.

I claim:

1. A loader for elevating a load to the top of an automotive vehicle and shifting the load over the top of such vehicle into a stowed position, comprising a load-supporting frame for carrying a load, guide means guiding said load-supporting frame for movement relative to said guide means between a lower position and an elevated position including an elongated guide member swingable between a depending position with its length upright and a raised position with its length substantially horizontal and substantially at the level of the vehicle top, pivot mounting means substantially at the level of the vehicle top, pivot means connecting said pivot mounting means and a specific portion of said elongated guide member located adjacent to the upper end thereof when said elongated guide member is in its depending position, and means guiding said pivot mounting means for movement across the vehicle top connected by said pivot means to said elongated guide member when said guide member is in its raised position.

2. The loader defined in claim 1, generally horizontal track means on top of the vehicle, and slide means carrying the pivot mounting means and movable along said track means.

3. The loader defined in claim 1, in which the elongated guide member constitutes upright track means, and the load-supporting frame includes rollers movable along said upright track means.

4. The loader defined in claim 3, generally horizontal track means on top of the vehicle, slide means engageable with said generally horizontal track means for movement over the top of the vehicle, and additional upright track means carried by said slide means and disposed in lengthwise alignment with and above the elongated guide member upright track means when the guide member is in depending position, said additional upright track means being engageable by the load-supporting frame rollers when the load-supporting frame has been elevated above the elongated guide member.

5. The loader defined in claim 4, and latch means operable to restrain swinging of the elongated guide member upward from its depending position while the load-supporting frame is being elevated along the elongated guide member, and releasable by movement of the load-supporting frame when its rollers are engaged with the additional upright track means.

6. A loader for elevating a load to the top of an automotive vehicle and shifting the load over the top of such vehicle into a stowed position, comprising a load-supporting frame for carrying a load, guide means including an elongated guide member swingable between a depending position with its length upright and a raised position with its length substantially horizontal and substantially at the level of the vehicle top for guiding said load-supporting frame for movement upward relative to said elongated guide member between a lower position below the vehicle top and an elevated upright position projecting a substantial distance upward above the vehicle top, means supporting said elongated guide member for movement over the top of the vehicle in such raised position, and shifting means including a hauling line independent of and remote from said guide member supporting means and extending linearly between a location on said load-supporting frame at one side of and a substantial distance above the vehicle top when said load-supporting frame is in its elevated position and pulling means at a location substantially at the level of the vehicle top and at its opposite side for shifting said elongated guide member and said load-supporting frame conjointly toward stowed position after said elongated guide member has been swung into its substantially horizontal position.

7. The loader defined in claim 6, in which the elongated guide member is variable in effective length.

8. A loader for elevating a load to the top of an automotive vehicle and shifting the load over the top of such vehicle into a stowed position, comprising a load-supporting frame for carrying a load, guide means including an elongated guide member swingable between a depending position with its length upright and a raised position with its length substantially horizontal and substantially at the level of the vehicle top for guiding said load-supporting frame for movement upward relative to said elongated guide member between a lower position below the vehicle top and an elevated position above the vehicle top, means supporting said elongated guide member for movement over the top of the vehicle in such raised position, said load-supporting frame being longer than said elongated guide member, pivot means connecting said load-supporting frame and said elongated guide member at a location adjacent to the lower end of said guide member in depending position for extension of a position of said load-supporting frame upward a substantial distance beyond the upper end of said elongated guide member when said elongated guide member is in its depending position and said load-supporting frame is disposed alongside and substantially parallel to said elongated guide member, and shifting means including a hauling line independent of and remote from said guide member supporting means and connected to said load-supporting frame above the vehicle top for shifting said elongated guide member and said load-supporting frame conjointly toward stowed position after said elongated guide member has been swung into its substantially horizontal position.

9. The loader defined in claim 8, in which the hauling line is connected to a portion of the load-supporting frame at a location a substantial distance above the elongated guide member when the elongated guide member is in its depending position and the load-supporting frame is disposed alongside and substantially parallel to the elongated guide member, and the hauling line extends substantially linearly between such connection to the load-supporting frame and the winch.

10. The loader defined in claim 8, generally horizontal track means on top of the vehicle, and slide means movable along said track means for effecting conjoint movement of the elongated guide member and the load-supporting frame over the top of the vehicle when the elongated guide member is in its raised position and the load-supporting frame is disposed alongside the elongated guide member.

11. The loader defined in claim 10, loading drive means for shifting the elongated guide member away from its depending position, and unloading drive means separate from said loading drive means for shifting the elongated guide member toward its depending position.

12. The loader defined in claim 11, in which the unloading drive means includes haulback spring means stressed by movement of the load-supporting frame over the top of the vehicle toward stowed position.

* * * * *

UNITED STATES PATENT OFFICE
CERTIFICATE OF CORRECTION

Patent No. 3,777,922　　　　Dated December 11, 1973

Inventor(s) Paul A. Kirchmeyer

It is certified that error appears in the above-identified patent and that said Letters Patent are hereby corrected as shown below:

Column 10, line 5, cancel "position" and insert --portion--.

Signed and sealed this 30th day of July 1974.

(SEAL)
Attest:

McCOY M. GIBSON, JR.　　　　C. MARSHALL DANN
Attesting Officer　　　　　　Commissioner of Patents